United States Patent [19]

Darjany

[11] 4,058,839

[45] Nov. 15, 1977

[54] MAGNETIC-TYPE INFORMATION CARD AND METHOD AND APPARATUS FOR ENCODING AND READING

[75] Inventor: John C. Darjany, Signal Hill, Calif.

[73] Assignee: R. D. Products, Inc., Victor, N.Y.

[21] Appl. No.: 502,532

[22] Filed: Sept. 3, 1974

Related U.S. Application Data

[63] Continuation-in-part of Ser. No. 499,198, Aug. 21, 1974, Pat. No. 3,946,206.

[51] Int. Cl.² .................... G06K 7/08; G11B 15/60; G11B 23/02
[52] U.S. Cl. ........................... 360/2; 235/488; 235/493
[58] Field of Search .................. 40/2.2; 428/329, 76, 428/900; 427/128; 235/61.12 M; 360/2, 8, 39

[56] References Cited

U.S. PATENT DOCUMENTS

| | | | |
|---|---|---|---|
| 3,221,428 | 12/1965 | Fischler et al. | 235/61.12 M |
| 3,308,010 | 3/1967 | Engelherdt et al. | 427/900 |
| 3,457,661 | 7/1969 | Peters | 235/61.12 M |
| 3,644,716 | 2/1972 | Nagata et al. | 235/61.12 M |
| 3,701,134 | 10/1972 | Gillard | 360/40 |
| 3,836,754 | 9/1974 | Toye et al. | 235/61.12 M |

Primary Examiner—Vincent Canney
Attorney, Agent, or Firm—Foster York; George H. Lee

[57] ABSTRACT

A flexible resilient magnetic particle type information card capable of correctly reading information thereon after such card has been bent double on itself and creased, said card comprising a flexible base, a layer of uniformly distributed magnetic particles thereon, and a flexible overlayer of nonmagnetic material, said over layer having a thickness of at least 2 mils, said layer of magnetic particles being magnetically encoded, the magnetic flux transitions of such encoding being at least 0.02 inch apart and said magnetic particle layer being enclosed between the base layer and over layer and spaced from the edges of the card.

A method of storing information in binary data form comprising magnetically recording information on a magnetic strip that has an over layer of at least 2 mils by inducing transitions in the magnetization of the strip at a minimum spacing of 0.02 - 0.1 inch.

A magnetic information card and card reader system comprising the magnetic information card described above in combination with a card reader having a slot accommodating the card in a tight but not binding fit and a structural portion of the reader having a hole forming a relief opposite the reading head of the reader.

27 Claims, 21 Drawing Figures

MAGNETIC-TYPE INFORMATION CARD AND METHOD AND APPARATUS FOR ENCODING AND READING

This application is a continuation-in-part of my copending application Ser. No. 499,198, filed Aug. 21, 1974 now U.S. Pat. No. 3,946,206.

BACKGROUND OF THE INVENTION

1. Field of the Invention

This invention relates to magnetic-type information cards and to a method and apparatus for encoding and reading magnetic-type information cards. More particularly the invention relates to mag-stripe information cards which are capable of withstanding the abusive and rough treatment of everyday use, such as of students who use them in magnetic-flux-type readers to determine whether they are entitled to a meal under various meal plans which are encoded on the card together with the identification of the student.

The rough treatment for example which students give to identification and meal plan mag-stripe cards is really unbelievable until one has seen such cards after being used by a large number of students over long periods of use, such as several weeks or months and for two or three times per day. In many cases the cards are bent back and, if a rigid type card, are broken; and if flexible, they are often bent double and creased on the magnetic stripe. The flexible cards are often crumpled and creased. Moreover the users often do not carry the cards in their wallets but instead carry them in their pockets where they may come in contact with keys, coins and the like material which can physically affect the magnetic stripe if it is not protected by an adequate overlay.

While the above such treatment may be particularly prevalent among students, similar rough treatment also occurs with hospital cards, industry and commerce card use and other uses where the cards are used several times per day for months at a time.

An object of this invention is to provide a flexible resilient information card which can withstand treatment such as above described and which can be read after such treatment, including creasing on the magnetic stripe, by magnetic-type readers with a first rejection rate because of an error in reading of less than one percent of the cards.

Another object is to provide an information card having a protective layer of 2 mils (0.002inches) or greater thickness over the magnetic layer and which provides the maximum amount of information in a small space and with the least number of tracks without reading error.

Another object is to provide improved methods and means for recording information on mag-stripe cards which have a coating of thickness of 2 mils (0.002inches) or greater over the magnetic stripe and for thereafter reading said information.

A further object is to provide improved means and methods for reading flexible resilient mag-stripe cards having a flexible resilient over layer.

2. Prior Art

Flexible mag-stripe information cards are known to the art, for example see Engelhardt et al U.S. Pat. No. 3,308,010, but so far as I know such cards are not in commercial use. Such cards have a layer over the magnetic oxide layer of approximately 0.5 mils (0.0005inches). A flexible card with such a thin overlay will not give adequate protection against rubbing by keys and the like. Such cards, with the normal prior art magnetic transition spacing, when bent double and creased on the magnetic stripe and then flattened, will give erroneous readings.

So far as I know the mag-stripe cards in present commerical use are so rigid that they cannot be bent double and creased without breaking. Also they all have either no overlay or an extremely thin overlay of about 0.5 mils (0.0005inches) or less. The standard mag-stripe card used by the American Bankers Association is relatively rigid and brittle in bending. It has the magnetic stripe on or very near the surface and is encoded at approximately 225 flux transitions per inch using one track.

The present trend for information cards appears to be in the direction of mag-stripe cards which are relatively rigid and which have as thin a layer as possible over the magnetic particle layer, since the thinner the overlay the better the resolution and the greater the information density.

The recently issued Kramer U.S. Pat. No. 3,811,977 shows an information card analogous to a punch card having magnetized spots that have a thick overlay of a thickness like that of applicant's invention but such a card is made of rigid vinyl and is not succifiently flexible to be bent and creased without breaking. Further, the spacing of the magnetized spots, due to the Kramer system of simultaneous stationary encoding is not desirable or economical when a considerable amount of information is needed on a card.

SUMMARY OF THE INVENTION

I have discovered that in order to provide a suitable information card which will satisfy the above objects and advantages of my card invention it is necessary that the magnetic particle layer on the card has an overlayer of a nonmagnetic material of at least 2 mils (0.002inches) thickness and that the magnetic layer be magnetically encoded, the magnetic flux transitions of such encoding being at least 0.02 inches apart such as, for example, 0.02 to 0.10 inches apart.

Any thickness of overlayer of between 2 and 30 mils is suitable for adequate reading with a spacing of flux transitions of 0.02 – 0.1 inch, the larger spacings preferably being used with the greater thicknesses of overlayer. However, a thickness of overlayer of 30 mils and more may be used with flux transition spacing of over 0.1 inch but such thicknesses are generally unnecessary and such larger spacings of flux transitions give less information per card than is usually desirable.

I have also found that for flexible mag-stripe cards which are subject to bending that the magnetic particle layer or stripe should be enclosed between the base layer or layers and the overlying layer and preferably spaced away from the edges of the card in order to avoid separation of the laminations and error in reading which I have found sometimes occur during use when students and others bend and otherwise roughly treat the cards.

For information cards for use in wallets and in the pocket, such as 2⅛ × 3⅜ inch cards and generally for any normal size information card, and sometimes for even larger cards, the information should preferably be recorded in at least two tracks.

Also, I have found that the double track code with data and complimentary bits representing "1" and "0", such bits being at the interface of changes in polarity in either direction gives particularly satisfactory results with my thick overlay. Such a double track code is shown in Phelps Pat. No. 2,774,646 for magnetic tape with flux transition of 1000 per inch and in Mitchell U.S. Pat. No. 2,952,018 for a mag-stripe information card with no overlying layer and with flux transitions of 100 per inch.

As used in this specification, the term magnetic transitions per inch refers to the number of times in a one inch space along a magnetic track a substantial change in magnetization occurs. Such a substantial change in magnetization, i.e. a magnetic transition, may involve a transition from one magnetic polarity to the opposite polarity, as in a non-return to zero system, or it may involve a transition from zero magnetization to a magnetization of either polarity, or a transition from a magnetization of either polarity back to zero. The quantitative relationship between flux density (flux transitions per inch) and bit density (bits per inch) depends upon the encoding scheme used, the Phelps scheme having only one transition space per bit, and the American Banking Association card requiring three transition spaces per bit.

I have found that I can provide satisfactory magnetization of the magnetic stripe, even though covered with an overlay having a thickness of between 2 and 30 mils, by employing an ordinary commercial encoding head designed for intimate contact recording, but using a forcing current about one order of magnitude greater than the design value. I have found that such heads have sufficient excess current carrying capacity that they will not burn out under such conditions.

The information card in accordance with one embodiment of my invention comprises a flexible and preferably resilient base sheet which may be of any material which is flexible and preferably resilient in sheet form, a strip of homogeneously or uniformly distributed magnetic particles thereon, and a flexible overlayer thereon of nonmagnetic flexible and preferably resilient material having a thickness of at least 2 mils (0.002inches), preferably 3-10 mils (0.003inches - 0.010inches).

Besides being especially durable under rigorous use, my card is also extremely difficult to read and/or reproduce without my special reading and/or encoding apparatus, and is therefore very difficult to counterfeit or alter.

The preferred card of this invention is sufficiently flexible so that it can be bent back on itself and creased without breaking and is so resilient that it will spring back at least part way to its original position. For this purpose at least the base or overlayer sheet, and preferably both, should be flexible and resilient.

The overlying sheet may be one or more sheets of any nonmagnetic material, preferably an organic material such as polyethylene terephthalate, polyethylene, polypropylene, polyamides, polytetrafluoroethylene, polyvinyl chloride, polyvinyl acetate, cellulose acetate, cellulose, paper and even thin sheets of nonmagnetic metal foil such as aluminum foil. Flexible water insoluble organic plastic sheets give better protection than water permeable sheets such as paper. In some cases the organic plastic compound is too brittle in the 2 mil (0.002inches) thickness or greater and must be plasticized or otherwise molded to obtain the desired flexibility and resiliency, but this is all within the state of the art.

I have also found it to be of advantage in obtaining good resolution on reading, particularly after bending and creasing of the card, to have the card made of a material which is so resilient and flexible that it will bend into an indent or hole on pressure of, for example, 8 pounds per square inch, and spring back after release of the pressure. Many materials known in the art have this property in sheet form of at least 2 mils thickness, one such material which has been found particularly satisfactory is a laminate of polyethylene terephthalate and polyethylene.

The base sheet may also be of this laminated material and the overlay sheet and base sheet may be heat sealed together by heat and pressure with the two polyethylene coatings in heat sealing contact; the magnetic strip being sandwiched therebetween and enclosed thereby so it is spaced from the edges of the card. A photgraphic film having a picture thereon may also be adhered to the base sheet between the base sheet and the magnetic particle layer, and this also is spaced from the edges of the card.

The information is encoded by a magnetic flux method through the overlayer on and into the layer of magnetic particles so that the flux transitions on the magnetic tracks are never closer to each other than 0.02 inch. Preferably, for a thickness of 2-10 mils (0.002inches - 0.010inches) of organic plastic overlay, the minimum spacing between magnetic transitions should be in the range 0.02 to 0.10 inch. Preferably two tracks are used in our system.

The information is preferably encoded on at least two tracks in order to get a suitable amount of information with the required magnetic transition spacing on ordinary size information cards. For multiple tracks a return to zero coding is suitable but preferably the nonreturn to zero reversal of polarity type coding of Phelps U.S. Pat. No. 2,774,646 is used.

The magnetic particles may be any of those known to the art including ferromagnetic particles such as ferric oxide particles. These may be coated directly in a layer or stripe on the top of the base sheet and laminated to the nonmagnetic overlying sheet, but preferably the particles are coated on a flexible strip of polyethylene terephthalate and this strip with the particles either toward or away from the overlayer, laminate to the base sheet and overlayer as in a sandwich. The thickness of the layer of magnetic particles is not important and suitably may be 0.2 - 1.0 mil or greater.

Preferably the multi tracks are two tracks or multiples of two. Those tracks are preferably encoded by a magnetic flux method of recording as will hereafter be described, preferably using a code system where one track is designated "zero" and the other "one". In the preferred system only one track changes polarity at a time. When the zero track changes polarity a zero is signified. When the "one" track changes polarity a one is signified.

In one card having a polyethylene terephthalate upper layer of, for example 5 mils (0.005inches), laminated over a layer of ferric oxide magnetic particles of thickness of 0.2 mils the two tracks on the magnetic particle layer have minimum spacing between magnetic flux transitions of 0.031 inch. The bits are at the interface between changed polarities, such alternate changes of positive and negative polarities being obtained by the magnetic recording system used to encode the cards.

I prefer to use a reader with a single reading head which is curved and has two magnetic gaps to read the two magnetic strips. A significant factor of my reader is that the card has a very close fit in the slot into which it is inserted for reading and the reading head projects somewhat into the slot so as to force the card to be deformed into a relief hole opposite the reading head, thereby maintaining a constant pressure between reading head and card and tending to straighten out any bends or creases in the card.

The limits of thickness of overlay and magnetic transitions per inch to give suitable readability on abusive use have been determined by experimental evidence and theoretical considerations. I have also considered excessive speed of withdrawing the information card from the reading apparatus, as well as readability after bending back and creasing.

The following Table I shows required minimum transition spacings for various overlayer thicknesses in order to produce excellent results, i.e. rejection rate because of errors on first reading of less than one per cent with creased cards:

TABLE I

| Flux Transition Spacing (inches) | Overlayer Thickness (mils) |
|---|---|
| .019 | 2 |
| .02 | 3 |
| .022 | 5 |
| .025 | 6 |
| .028 | 7 |
| .033 | 8 |
| .040 | 10 |
| .05 | 15 |
| 0.10 | 30 |

The type of material has been considered. The minimum thickness of overlay of 2 mils holds for all types of nonmagnetic flexible material, including organic plastics and cellulose. Even nonmagnetic metal foil should not be thinner than 2 mils for optimum results. However for a thickness of overlay of over 2 mils, for any purpose, the problem of resolution exists and is solved by the means disclosed in this applied specification.

DETAILED DESCRIPTION OF THE INVENTION

1. The Information Card

Figure 1:
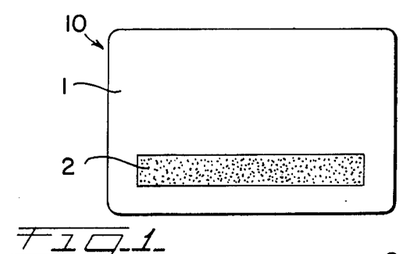
FIG. 1 is a plan view of a magnetic card constituting one embodiment of this invention and showing the magnetic stripe before recording.
Figure 2:
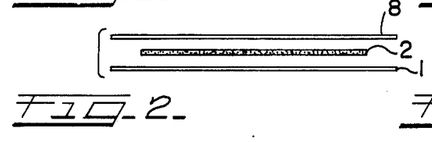
FIG. 2 is an expanded sectional view of FIG. 1.
Figure 5:
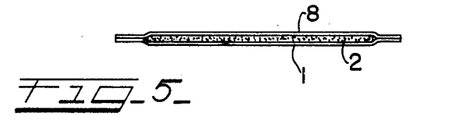
FIG. 5 is a sectional view of the magnetic card of FIG. 1 and FIG. 2 showing the sheets laminated together.

Referring to FIG. 1, FIG. 2 and FIG. 5 there is shown a simple type of magnetic type information card which differs from the information card shown in Engelhardt et al Patent 3,308,010 in that the overlay sheet 8 has a thickness of at least approximately 2 mils (0.002 inch), as for example 5 mils instead of the 1/2 mil overlay of the patent, and the powdered magnetic substance, such as ferric oxide ($Fe_2O_3$) is contained in a stripe 2 which is completely enclosed by the base sheet 1 and the overlay sheet 8. The substrate 1 also has a thickness of at least 2 mils when made of organic material and like the substrate of the patent may be made of polyethylene terephthalate material of a thickness of 5 mils. It also may be made of or include a positive film having a photograph thereon, said film for example being cellulose triacetate of a thickness of 5 mils. The overlay may be made of polyethylene terephthalate such as Mylar having the required thickness to give a tough protective covering of for example 3-20 mils. With this thickness the crystaline alignment of U.S. Pat. No. 3,308,010 is unnecessary. The magnetic material and the sandwich of magnetic material between the plastic sheets may be made as described in U.S. Pat. No. 3,308,010. However, instead of coating the magnetic layer directly on the substrate there may be used a strip of tape having the oxide coated on it. This is laminated between two plastic sheets of suitable thickness of at least 2 mils.

So long as at least one sheet of the information card is made of non magnetic material such as organic plastic of a thickness of 3-10 mils a recording such as a double track encoding can be made through the sheet by a method of recording which will be described herein; this recording giving a double track with between 10 and 50 bits per inch, for example 32 bits per inch. Such multi-track encoding with such bit spacing allows suitable resolution during reading through the thick overlay on the information cards, even when creased or crumpled, as described herein. The encoded information card with the double track is shown with the parallel tracks and imaginary bits as dots in FIGS. 3 and 4.

FIGS. 6–9 show more sophisticated embodiments of information cards both of which have given highly satisfactory results from the point of view of wear resistance and readability.

Figure 6:
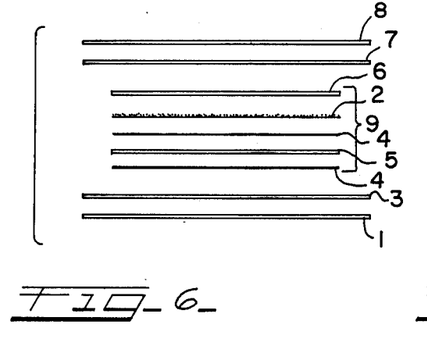
FIG. 6 is an expanded sectional view of another embodiment of the invention showing another type of magnetic stripe information card.
Figure 7:
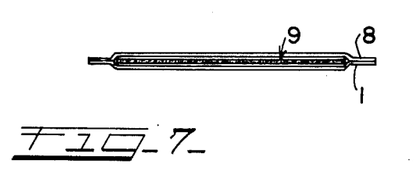
FIG. 7 is a sectional view of the embodiment of FIG. 6 showing the top and bottom sheets laminated together.

Referring to FIG. 6, the information card of a preferred embodiment of the invention includes a base sheet 1 which may illustratively have a thickness of 3 mils having a polyethylene heat sealable layer 3 laminated to it, of preferably a thickness of 2 mils. The base sheet 1 may be made of polyethylene terephthalate material. The base sheet 1 may have a generally rectangular configuration, illustratively 2 inches by 3⅜ inches, and may be transparent or not. Secured to the polyethylene layer 3 of the base sheet 1 is a positive film 5 having a photograph and other information thereon, the photograph and information facing the polyethylene layer 3 so they are visible through the base sheet 1. The positive film may be of a cellulose acetate such as cellulose triacetate. Preferably a curable acrylic glue or other adhesive 4 is coated on both sides of the positive film 5. Secured to the positive film 5 on the nonphotographic side is magnetic oxide stripe 2 which does not extend to the edges of the underlying and overlying sheets as shown in FIG. 1. This magnetic oxide stripe 2 may comprise a layer of ferric oxide particles mixed with an adhesive and wetting agent as is well knwon in the art and described in U.S. Pat. No. 3,308,010. The layer 2 may illustratively have a thickness of 0.8 mil and is, for the preferred embodiment, coated on a polyethylene terephthalate (Mylar) sheet 6. The oxide layer 2 is the embodiment shown in FIG. 6 and FIG. 7 is against the positive film layer 5 adhered to it by the adhesive layer 4. Laminated to and extending beyond the Mylar layer 6 and oxide layer 2 of the mag-stripe is a polyethylene layer 7 coated on the under side of polyethylene terephthalate layer 8. Illustratively the Mylar sheet 6 has a thickness of 2 mils, the polyethylene layer 7 a thickness of 2 mils and the top Mylar sheet 8 a thickness of 3 mils so that the total thickness of plastic over the magnetic oxide layer is approximately 7 mils.

Figure 3:
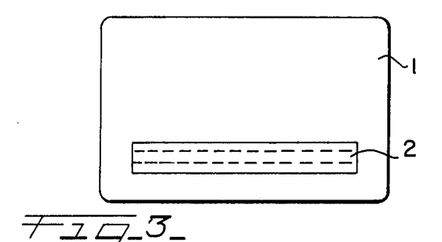
FIG. 3 is a plan view of the recorded magnetic card of FIG. 1 showing in schematic form a two-track recorded magnetic stripe.
Figure 4:
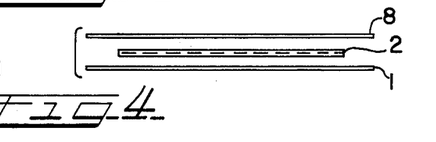
FIG. 4 is an expanded sectional schematic view of the recorded card of FIG. 3.

FIG. 7 shows the layers of FIG. 6 laminated and secured together. It will be noted that the polyethylene coated Mylar layers 8, 7 and 1, 3 are brought together and seal in the magnetic stripe 2 and the positive film 5. The magnetic stripe 2 on base 6 with adhesive 4 on both sides of the film 5 are indicated by the numeral 9 in FIGS. 5, 6, 7 and 8. The sealing together may readily be accomplished by heat and pressure to produce a heat seal because of the character of the polyethylene layers 3 and 7. It is preferable, from the standpoint of desirability, that the mag-stripe be sealed on all sides as shown in FIG. 1 and FIG. 3.

Figure 8:
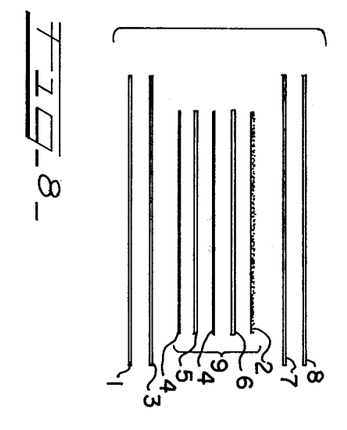
FIG. 8 is an expanded sectional view of another embodiment of the invention showing the magnetic oxide layer in reverse of that shown in FIG. 6.
Figure 9:
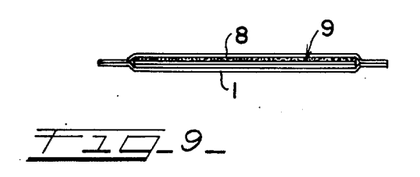
FIG. 9 is a sectional view showing the card of FIG. 8 with the sheets laminated together.

FIGS. 8 and 9 show the same arrangement as in FIGS. 7 and 8 except that the mag-stripe is reversed so that oxide layer 2 is against the polyethylene layer 7 and the Mylar base 6 of the mag-stripe is against the adhesive 4 and positive film layer 5. This makes a plastic overlay or covering for the magnetizable oxide of 5 mils instead of the 7 mils of FIGS. 6 and 7.

Figure 10:
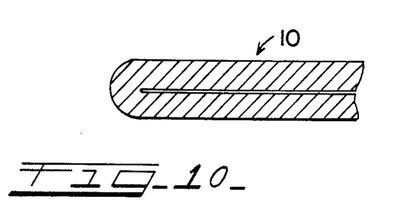
FIG. 10 is a fragmentary sectional view of the information card of my invention bent double on itself and creased.

FIG. 10 shows the card of FIG. 2 doubled back on itself and creased, the crease being on the magnetic stripe length or transverse to it. Such a card, if constructed and encoded pursuant to the principle of my invention, may be read satisfactorily in the apparatus of my invention. The relatively thick overlay on the magnetic stripe does not appear to reduce the readability of a bent or creased card as much as one would expect. While I do not wish to be bound by this theory, it is hypothesized that the creasing is primarily a surface effect, and that the distortion effect of creasing on the actual magnetic stripe is greater when the magnetic stripe is at or near the surface of the card than when the stripe has a relatively thick overlay as in our invention. In other words, the overlay may diffuse the distortion effect of a crease on the actual magnetic medium. This effect would tend to reduce the change in magnetic intensity which would normally be severe in the case of bent or creased cards, and I believe, to a large extent, accounts for the unusually high readability I obtain with my bent or creased cards.

2. The Encoding Apparatus And Method

Figure 11:
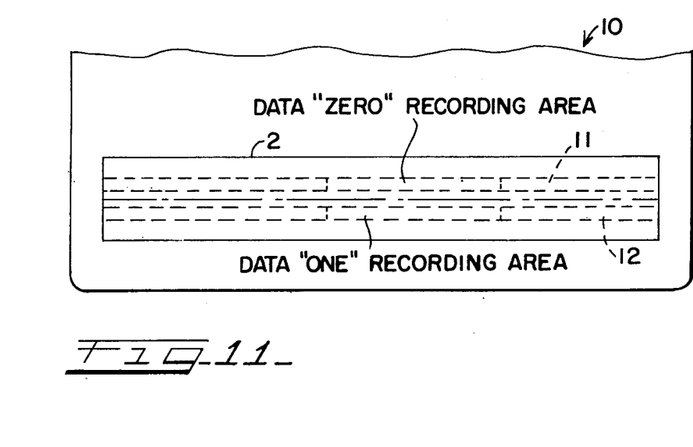
FIG. 11 is a fragmentary plan view of the lower portion of FIG. 1 with the two magnetic tracks schematically indicated.

Referring to FIG. 11, the lower portion of the information card 10 of FIG. 1 is shown in enlarged form. The homogeneous magnetic medium forming magnetic stripe 2 is disposed inwardly on the side and bottom edges of the cards, that is, it does not extend to any edge of the card. This aspect of my invention contributes substantially to the durability of the card under the rigorous conditions of use. In the preferred embodiment, the magnetic stripe 2 is 0.5 inch wide and 3.19 inches long, and the card extends beyond the ends of the stripe 0.0925 inch and beyond the bottom of the stripe 0.3125 inch. These dimensions assume a standard 2.125 inch by 3.375 inch card. Similar dimensions are arrived at when using other standard sizes such as 2.3125 inches by 3.250 inches.

Reference numerals 11 and 12 schematically represent the two magnetic data tracks where the information is magnetically recorded, the upper track 11 being reserved for binary zero's and the lower track 12 being reserved for binary one's. As indicated, in the preferred embodiment, the two tracks are each 0.08 inch wide and 0.08 inch apart. Although the entire length of the magnetic stripe is potentially capable of carrying magnetic data, in the particular card of my specific embodiment only the right-most (in FIG. 11) two inches can be used since the left side of the card is used to hold the card while it is being read. In one information system where I employ the card, only that one inch length of each track indicated in FIG. 11 as a "data recording area" is employed, since this length is sufficient to record the desired information in this particular system. In another system I employ the full usable 2 inches.

Figure 12:
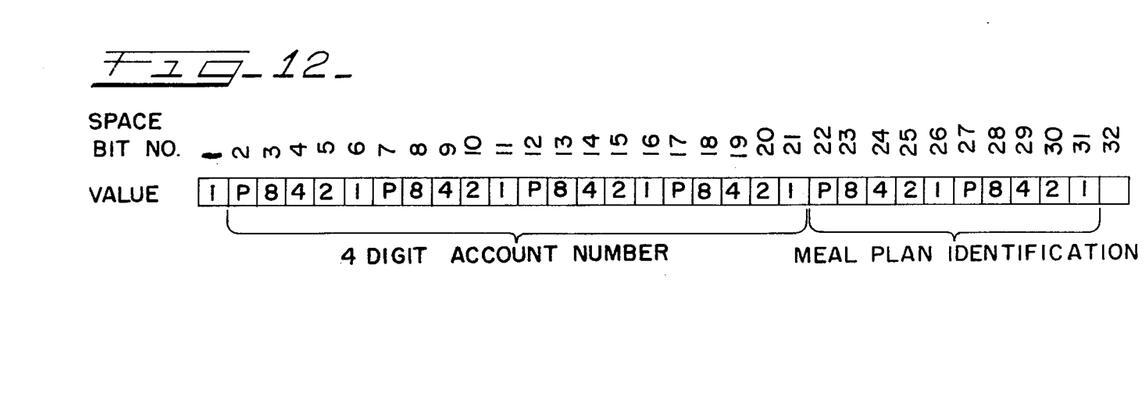
FIG. 12 is a representation of the binary bit information encoded on the card for a typical use system.

FIG. 12 shows the use which is made in my system of the space for the 32 bits afforded by the one inch length of data recording area. Bit No. 1, the left most bit in FIG. 12, is a flag bit, always a one, the purpose of which will be described hereinafter. A hexadecimal even parity five bit system is employed, the parity bits being zero or one as is necessary to make the total number of ones in each five bit byte an even number. Each parity bit and the following four bits constitute one byte, either a decimal digit from zero to nine or a letter from A to F. Bits 2 through 21 are used to identify a four digit account number individual to the user to whom the card is issued, for example, account number 3094. In the case of student boarding plans bits 22 through 31 are used to define the particular meal plan to which the student has subscribed, for example, meal plan 3F. In my particular system, the space for a thirty-second bit is not needed and is not used. Accordingly, a total of 31 bits are actually recorded and later read from each card.

Figure 13:
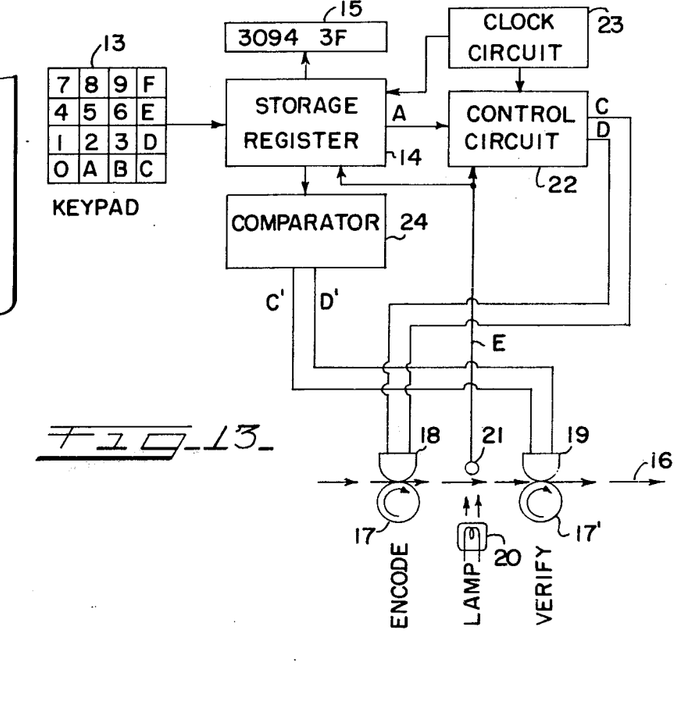
FIG. 13 is a schematic and wiring diagram of the apparatus for magnetically encoding the magnetic information card.

FIG. 13 is a schematic representation of the recording apparatus employed in my system, the arrows denoting the direction of flow of information. FIG. 13 is best understood when taken together with FIG. 14 which indicates the wave forms transmitted on lines A, B, C, D, C' and D' of FIG. 13 in the exemplified situation where the bit series being recorded is 11000110010.

A standard manual hexadecimal keypad 13 is used to introduce the account number and plan information, e.g. 3c943F, into the recording apparatus where it is stored in a standard storage register 14 until the card recording is made and verified. Simultaneously, the information punched into the keypad is displayed, as indicated at 15, so that the operator may verify his punching operation.

The card is inserted in a track in the recording apparatus and is caused to move from left to right, along the path indicated by reference numeral 16, by a constant speed drive indicated schematically by drive rollers 17, 17'. As the card traverses the track, its two magnetic tracks 11 and 12 first pass adjacent a two gap recording head 18 and then a two gap reading head 19. A card position sensing system consists of a directional lamp 20 which directs a narrow beam of light across the path of the card at a light sensitive sensor 21 such as a photoelectric cell. The spatial arrangement is such that when the card interrupts the light beam, the magnetic recordings area of the two tracks is just beginning to pass under the respective gaps of recording head 18. The interruption of the light beam is signalled to the control circuit 22 and storage register 14, as on line E, thus initiating the serial release of the stored information from storage register 14 to control circuit 22, as on line A.

Figure 14:
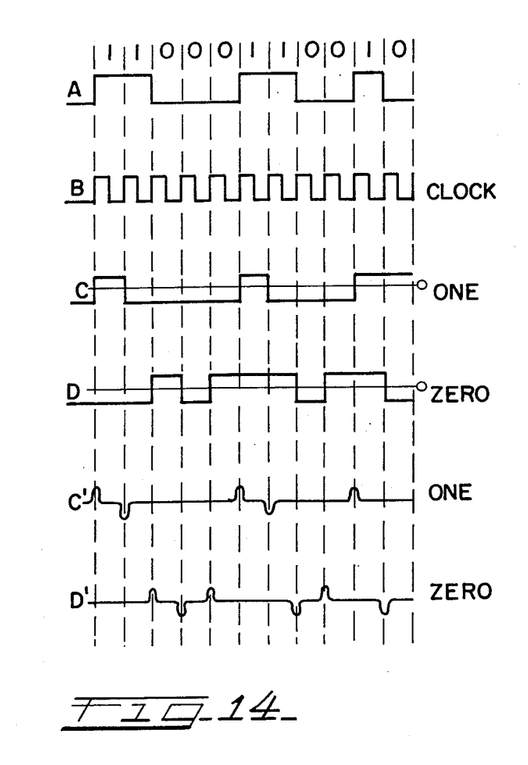
FIG. 14 illustrates wave forms generated on particular lines of FIG. 13.

A clock circuit 23 generates a constant frequency square wave clock pulse as indicated at B of FIG. 14, which pulse is fed to the storage register 14 and the control circuit 22. The frequency of the clock pulse is coordinated in the initial design with the constant speed of travel of the card such that, in our specific example, there are exactly 32 evenly spaced bit spaces on the one inch lengths of data recording area which is used. The bit spaces are thus 0.03125 inch apart. As will later be clear, in the particular two track encoding system I use (Phelps U.S. Pat. No. 2,774,464), there is a one to one relationship between bit spacing and the smallest possible spacing between magnetic transitions on a magnetic track, such as occurs when a binary number repeats itself, such as in a zero-zero series or a one-one series. Thus the smallest possible spacing between magnetic transitions on a track is 0.03125 inch, or to state it another way, the magnetic transitions on a track are at least 0.03125 inch apart in the particular card I use. As explained elsewhere, the spacing of the magnetic transitions on a track is an important aspect of my invention. In accordance with the invention, the magnetic transitions should be at least 0.02 inch apart, corresponding, in the Phelps two track encoding system, to an information density of 50 bits per inch. As indicated this magnetic transition spacing is physically determined in the recording apparatus by the frequency of the clock pulse and the speed of the card drive system.

Referring particularly to FIG. 14 wave form A represents the manner in which the stored binary data is sent from the storage register 14 to the control circuit 22. It will be noted that the ones and the zeros are distinguished at this point solely by a difference in signal amplitude in the normal manner. The control circuit 22 generates, from signal A and the clock pulse, write current signals C and D which latter signals are fed respectively to the one and zero coils of recording head 18. In accordance with the aforementioned Phelps encoding system, the write current signal C reverses direction each time a binary 1 appears and at no other time. Similarly, the write current signal D reverses direction each time a binary zero appears and at no other time. Thus, a binary one will result in a reversal of polarity of the magnetization of the "one" track 12 and a binary zero will result in a reversal of polarity of the magnetization of the "zero" track 11. It should be noted that the direction of the reversal is of no significance, and that there is a reversal, either on the one track of zero track for each bit spacing, i.e. for each full wave length of the clock pulse.

C' and D' in FIG. 14 represent the wave forms of the read current signals induced in the respective coils of reading head 19 by the magnetization resulting from writing signals C and D, respectively. Since C' and D' are therefore the time derivatives of C and D, respectively, a pulse occurs on line C' of FIG. 13 wherever a one appears, and a pulse occurs on line D' wherever a zero appears. Here again the polarity of the pulse is of no significance, and a pulse occurs on either line C' or D' for each bit. The read signals C' and D' are fed to a comparator 24 where the binary series represented thereby is compared with the binary series received from the storage reservoir to verify that the recording operation has been free of error.

The Phelps U.S. Pat. No. 2,774,646 may be referred to for details of suitable conventional circuity for generating the write current C and D of the two track system.

An important aspect of my invention has to do with the severe problem of producing satisfactory magnetization of a magnetic stripe which is covered with an overlay having athickness of 2 mils or more. Recording heads on the market are designed for recording on immediately adjacent or nearly adjacent magnetic stripes since the magnetic information cards in use have little or no coating. The problem was solved by utilizing a forcing writing current about an order of magnitude greater than the normal design writing current of the recording head. For example, I use a Nortronics Encoding Head model DQ21G048S19 to encode magnetic cards having a 5 mil overlay on the magnetic stripe. The recommended write current for this head is 12 milliamps. (Nortronics Design Digest, Mini-Digital Magnetic Recording, 3rd edition, page 24.) Recording through the 5 mil overlay could not be accomplished at or near the recommended writing current. Surprisingly, I found that when I used a forcing current of 100 milliamps, not only was satisfactory recording effected but the recording head did not burn out or suffer any other ill effect.

3. The Reading Apparatus And Method

Figure 15:
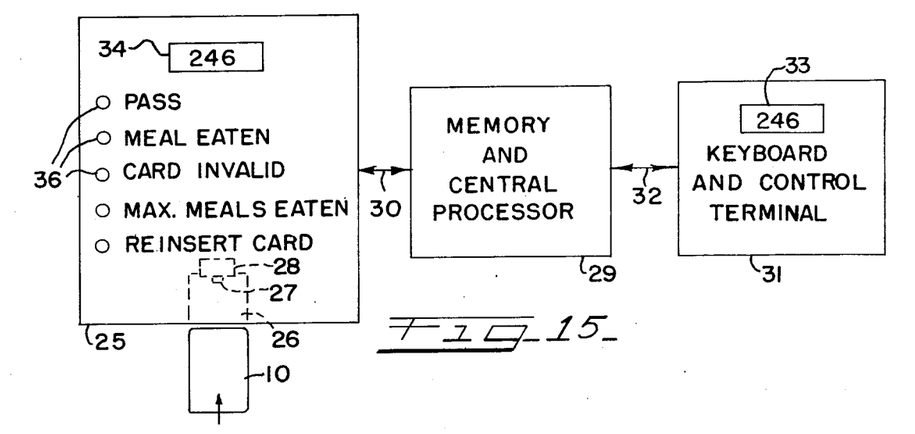
FIG. 15 is a block diagram of the three main components of the meal plan system which forms and is part of the environment for the present invention.

Referring to FIG. 15, in the interests of completeness, there is shown in block form the complete meal plan system which forms and is part of the environment for the present invention. In the case of a meal plan system application a card reader 25 is located at the dining room entrance to verify that the student is entitled to the meal currently being served. The magnetic card 10 is inserted into the slot, indicated at 26, and signals that it has been inserted all the way by depressing the button 27 of switch 28. The card could be read upon insertion or upon withdrawal, but I prefer to read it upon withdrawal since it is found that the speed of manual withdrawal tends to be more constant than the speed of manual insertion.

The signal that the card has been inserted is sent to the memory and central processor 29 by way of transmission channel 30 and such signal clears a shift register in processor 29 so that it can receive and store the information as to student identification and meal plan which is read as the card is being withdrawn and transmitted serially to the processor via transmission channel 30.

A keyboard and control terminal 31 is provided for the cafeteria business office to initially put into the memory of the control processor, by way of transmission channel 32, information as to the meal plans to which the individual students have subscribed and to revise such information as may be necessary thereafter for one reason or another. The operator of the keyboard and control terminal, besides adding, deleting or revising information in the memory, can also query the memory as to the status of an individual account, total current meals eaten by all students, etc., and such information is transmitted back to the control terminal 31 from the processor 29 and displayed as indicated at 33.

Receipt by the processor 29 from card reader 25 of the account number and meal plan information read from a card automatically initiates a query of the memory as to whether the memory contains any information under the particular account number, and if so, the status of the account. The processor 29 sends back to the card reader 25 any one of five responses, as indicated by signal lights 36, namely (1) "pass" — the account is valid and entitled to the current meal; (2) "meal eaten" — the account is valid but the current meal has already been eaten; (3) "card invalid" — the meal privileges for this account have been withdrawn; (4) "max meals eaten" — the account is valid but the maximum number of meals to which entitled under the particular meal plan have been eaten; and (5) "reinsert card" — this direction appears if parity on the card or in the communication link shows an error or if an account number is read for which there is no record in the memory of the central processor. When the central processor reports "pass" to the reader, it also automatically appropriately revises the memory by adding one to the number of meals eaten.

The card reader also receives from the central processor information as to total current meals eaten by all students, as indicated at 34 and also information as to the number of meals eaten by the individual student in the current week or other meal plan period, this latter information being flashed momentarily at 34.

In the usual installation, the memory and central processor 29 is a special purpose digital computer designed and wired using conventional data processing techniques for this particular application, and it and the keyboard and control terminal 31 are located at or near the cafeteria together with the card reader. However, the memory and central processor 29 and/or the keyboard and control terminal 31 may be remotely located, and the memory and central processor may be a time-shared general purpose computer, e.g. in IBM SYSTEM /7, which is especially programmed for this application. In a situation where the central processor 29 and/or keyboard and control terminal are located remotely from the card reader or from one another, the transmission channels 30 and 32 may consist of an ordinary telephone line having a MODEM termination at each end over which line digital information is transmitted as a constant amplitude signal of two different frequencies associated respectively with zeros and ones. A single telephone line will suffice in each case since information is being transmitted in only one direction at a time.

Figure 16:
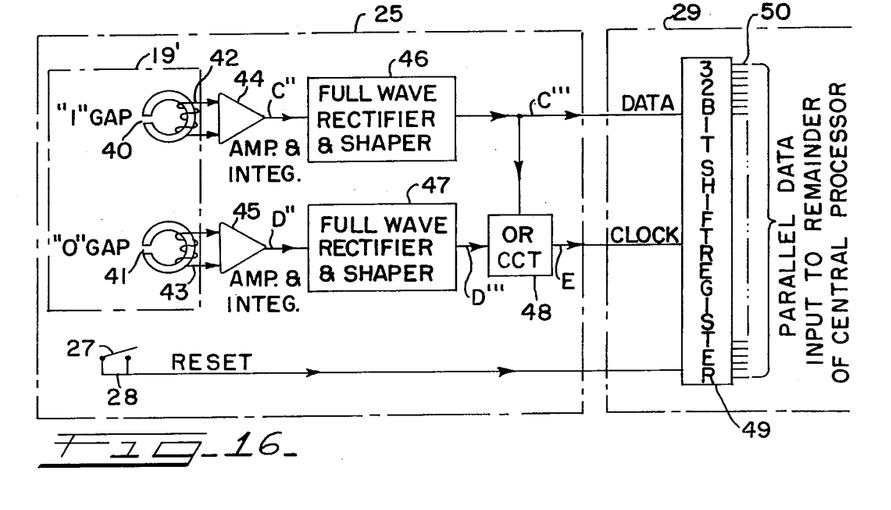
FIG. 16 is a schematic and wiring diagram of the reading apparatus of FIG. 15 and the initial input portion of the central processor of FIG. 15.

Referring now to FIG. 16, wherein the electrical system for the reading and initial processing of the information magnetically encoded on the two tracks is shown, reference numeral 19' represents a reading head in card reader 25 having two gaps 40 and 41. The reading head is spatially related to slot 26 such that the "one" magnetic track of card 10 passes over the zero gap 41, as card 10 is withdrawn from its fully inserted position in the reader. As with the recoding head 19 of FIG. 13, I prefer to use a single reading head having two magnetic gaps, although two separate reading heads could be used if desired. In the preferred form of my system, I use a Nortronics Model B2H2K-NO reading head as heads 19 and 19' of FIGS. 13 and 16.

Coils 42 and 43 associated with gaps 40 and 41, respectively, feed the amplifier and integrators 44 and 45, respectively, the outputs C" and D" of which feed respective full wave rectifiers 46 and 47, respectively. The output C''' of full wave rectifier 46 provides one input to the "OR" circuit 48, the other input to the "OR" circuit being provided by the output D''' of full wave rectifier 47. The output C''' of full wave rectifier 46 can be considered as the "data" line and it provides the data input to a conventional 32 bit shift register 49 at the input side of the central processor 29. The output of the "OR" circuit 48 provides, as will hereinafter be apparent from FIG. 17, a clock pulse for the shift register 49.

Figure 17:
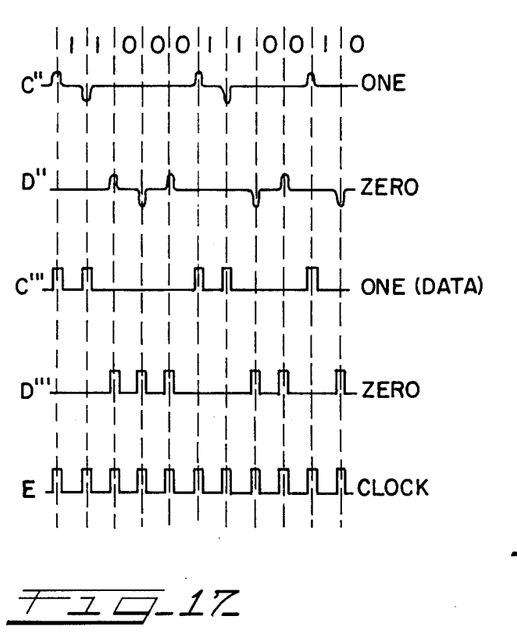
FIG. 17 illustrates wave form generated on particular lines of FIG. 16.

In FIG. 17, the wave forms of the various signals C", D", C''', D''', and lock signal E are shown for the same illustrative case as was used in connection with FIG. 14, namely a binary series 11000110010. In recorder of FIG. 13, the speed of the card was constant and therefore the signals C' and D' generated in the respective coils of reading head 19 were of a constant amplitude, as indicated in FIG. 14. In the case of the reader 19', however, the speed of the card 10 may change as it is manually withdrawn from the reader. Amplifiers and integrator 44 and 45, acting as clipper circuits, are therefore used to process the variable amplitude signals (not shown) from coils 42 and 43 into constant amplitude signals C" and D" identical to signals C" and D" of FIG. 14. The full wave rectifiers and shapers 46 and 47 transform the bipolar signals C" and D" into unidirectional square wave signals C''' and D''', respectively, a positive square wave pulse appearing on line C''' at every bit space containing a "one" and an identical positive square wave pulse appearing on line D''' at every bit space containing a zero. Inasmuch as in the illustrated system of decoding (the aforesaid Phelps system) a "zero" or a "one" appears at every bit space, the output E of the "OR" circuit 48 necessarily exhibits a pulse at every bit space, and it can therefore be used as the clock pulse input to shift register 49. It will be apparent that the present data reading and processing system is self clocking irrespective of variation in the speed of card 10 during withdrawal from the reader.

As card 10 is withdrawn from the reader, the shift register is serially filled up with, for example, the 31 bit binary series recorded on the card, "one" being entered at every bit space where a clock pulse and a "one" simultaneously occur on lines E and C''', respectively, and a "zero" being entered at every bit space where a clock pulse occurs on line E and no signal appears on line C'''. The transferral of the complete binary series from the card 10 to the shift register 49 is signaled by the entree of the "one" flag bit from bit space No. 1 of the card (see FIG. 12) in the 31st bit space of the shift register. The complete binary series can then provide the conventional parallel data input to the remainder of the central processor on output lines 50, as indicated.

Also shown in FIG. 16 is the operating button 27 of switch 28 described in connection with FIG. 15. When the card 10 is fully inserted in reader 25, the closing of switch 28 provides a signal which resets register 49 so that it is ready to receive a new binary series as the card is withdrawn.

Referring to FIGS. 18 through 22, there is shown a molded portion 51 of reader 25 which forms slot 26 and supports reading head 19' in a position underneath the card. The slot 26 has dimensions only the slightest bit greater in width and thickness than the width and thickness of the card itself. Thus, very little play of the card is possible laterally or up and down when it is inserted into the slot. In view of this relatively tight, but not binding fit, a larger (in both directions) opening 52, is provided in the front face of the molded portion 51, and the inwardly slanting planes 53 connecting this longer opening with slot 26 form a kind of funnel to facilitate the manual insertion of the card into the slot. The relatively tight, but not binding fit, of the card in the slot, when taken with the previously described flexibility and resiliency characteristics of the card itself, has the important beneficial effect of tending to straighten out and remove creases from bent and/or creased cards.

Figure 18:
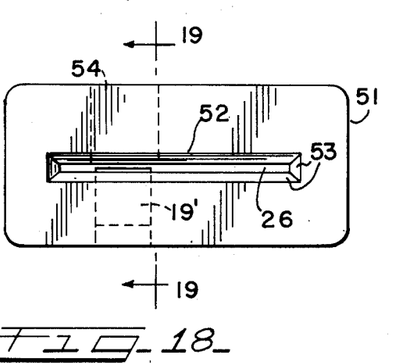
FIG. 18 is an elevation view of the molded portion of the reading apparatus which forms the slot and supports the reading head.
Figure 19:
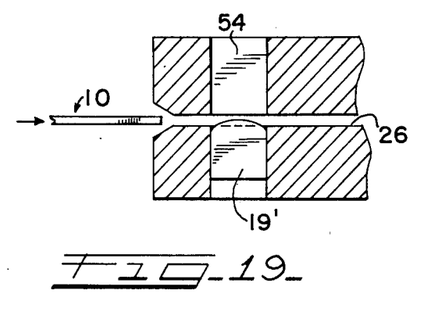
FIG. 19 is a sectional view taken along lines 19-19 of FIG. 18.
Figure 20:
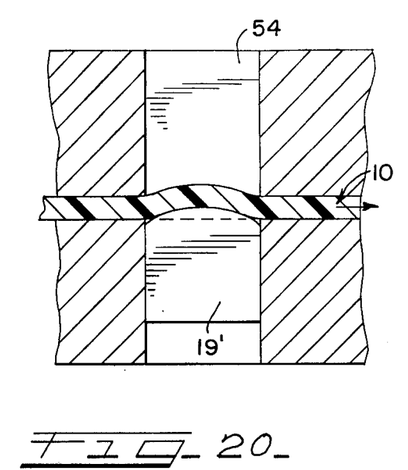
FIG. 20 is a magnified fragmentary sectional view showing the forced local deformation of the magnetic card in the direction of card travel.
Figure 21:
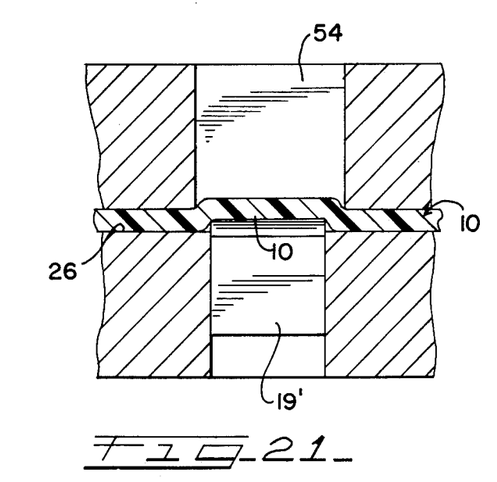
FIG. 21 is a magnified fragmentary sectional view showing the forced local deformation of the magnetic card in a direction normal to that of FIG. 20.

An important feature of the invention is that the reading head 19' is positioned so that its operating end (which contains the magnetic gap) extends an appreciable distance into the slot 26, as best seen in FIGS. 19 and 20. For example, assuming a card thickness (and slot width) of 22 mils, the reading head should extend into the slot about 7 mils. In order to accomodate the thickness of the card at the reading head a rectangular relief hole, indicated at 54, is provided in the molding on the opposite side from the reading head. As indicated in FIGS. 19 and 20, the hole is the same dimension as the reading head along the direction of travel of the card. In a direction normal to the direction of travel of the card, the dimension of the hole must be somewhat greater than that of the reading head, preferably about one-sixteenth inch, as best seen in FIGS. 18 and 21.

When the card is inserted into the slot, its leading edge strikes the rounded surface of the reading head 19'. Sufficient force must then be applied to force the portion of the card in contact with the reading head up and around the curved portion so that it conforms to the curved surface, and its upper side extends in the same curved fashion into hole 54, as best seen in FIG. 20. In the direction normal to the direction of travel of the card, the fact that the hole has a greater dimension than the reading head provides sufficient leeway to permit the card to extend up into the hole, as best seen in FIG. 21. Thus, there is effected a localized region of stress and deformation of the card about equal in area to that of the reading head, which region travels along the length of the card as the card is inserted and withdrawn from the reader. When taken in association with the flexibility and resilience characteristics of the card, this localized deformation has two important advantageous effects: (1) the card maintains a continuous and repeatable pressure over about a one-half square inch surface of the reading head of an appropriate value of about eight pounds per square inch, and (2) any bends or creases in the card in the area containing the magnetic medium tend to be removed as the card is inserted.

In summary, a number of features of my overall system cooperate in a unique way to provide an information card and associated apparatus which are especially durable and reliable under rigorous condition of use in the field, the more important of these features being the following:

1. the provision of a margin on all sides of the sealed magnetizable medium;
2. the thickness and composition, as described, of the various layers making up the cards;
3. the provision of a protective overlay of at least 2 mils over the magnetic stripe;
4. use of a self-clocking encoding system, such as the Phelps system, which has a high information content per magnetic transition;
5. the maintenance of a minimum spacing between magnetic transition of at least 0.02 inch on any track;
6. the use of a very high forcing current in the recording head used to encode the magnetic stripe through the overlay; and
7. the provision of a relief hole opposite the reading head in association with a unique spatial relationship between card, card slot, and reading head, such that a portion of the card is locally stressed and deformed into the relief hole as it is inserted into the slot.

I claim:

1. A flexible resilient magnetic particle type information card capable of correctly reading information thereon after such card has been bent back double on itself and creased at the region of the card that includes the magnetic particles, said card comprising a flexible base, a layer of uniformly distributed magnetic particles thereon, and a flexible overlayer of nonmagnetic material, said overlayer having a thickness of at least 2 mils, said layer of magnetic particles being magnetically digitally encoded, consecutive equal portions of said layer having one polarity of magnetic flux or the opposite polarity, with abrupt magnetic flux transitions between oppositely polarized portions, the magnetic flux transitions of such encoding being at least 0.02 inch apart and said magnetic particle layer being enclosed between the base layer and overlayer and spaced from the edges of the card.

2. An information card in accordance with claim 1 in which the information is encoded in at least two tracks along said layer of magnetic particles, and the flux transitions are 0.02 to 0.10 inch apart.

3. An information card in accordance with claim 2 in which one track represents "ones" and the other track "zeros", the bits are at the interface of a change in polarity in either direction, and there is a change of polarity on one track or the other at each of the evenly spaced bit spaces.

4. An information card in accordance with claim 3 in which the overlayer is an organic plastic having a thickness of 2-10 mils and the minimum magnetic transition spacing being in the range of 0.02 to 0.10 inch.

5. An information card in accordance with claim 4 in which the organic plastic overlay is polyethylene terephthalate having a coating of polyethylene on its underside.

6. An information card in accordance with claim 1 in which the card base is a sheet of polyethylene terephthalate having a layer of polyethylene thereon and including a sheet of cellulose acetate with one side against the said layer of polyethylene, the magnetic particles are coated on a strip of polyethylene terephthalate and are between the base sheet and the overlay sheet, and the overlay sheet is a sheet of polyethylene terephthalate having a layer of polyethylene thereon, the layer of polyethylene on the base sheet and on the overlay sheet being in contact with each other at the four edges of the card and adhering together so as to completely enclose the strip of magnetic particles.

7. An information card in accordance with claim 1 in which the card base comprising a polyethylene terephthalate sheet having a layer of polyethylene thereon and a sheet of cellulose acetate on the said layer of polyethylene, the magnetizable particles are on a sheet of polyethylene terephthalate with the polyethylene terephthalate being against the cellulose acetate sheet, and the over layer comprises a layer of polyethylene over the oxide layer and an upper sheet of polyethylene terephthalate on the polyethylene layer.

8. An information card in accordance with claim 6 in which an acrylic adhesive is on both sides of the cellulose acetate sheet so as to secure the magnetizable layer to one side of the cellulose acetate sheet and the base polyethylene layer to the other side of the cellulose acetate sheet.

9. An information card in accordance with claim 7 in which an acrylic adhesive is on both sides of the cellulose acetate sheet so as to secure the cellulose acetate sheet to the polyethylene layer on the underside of the over layer of polyethylene terephthalate.

10. An information card in accordance with claim 1 in which the magnetizable particles are in a stripe and completely enclosed so that the stripe of said particles stops short of all edges of the base and overlay material.

11. An information card in accordance with claim 1 in which the card is flexible and of such resiliency and flexibility that the card will bend into an identation on application of pressure and will spring back on release of the pressure.

12. An information card in accordance with claim 1 in which the card base comprises a sheet of polyethylene terephthalate having a layer of polyethylene thereon and a sheet of cellulose acetate on said layer of polyethylene, the magnetic particles are on a strip of polyethylene terephthalate with the magnetic particles against the sheet of cellulose acetate and the polyethylene terephthalate on which the magnetic particles are coated is against the polyethylene layer of the overlaying polyethylene terephthalate sheet.

13. An information card in accordance with claim 1 in which the card is composed of layers of plastic material of a flexibility and resilience such that on bending the card double on itself it will not break and will spring back at least part way to its original position.

14. An information card comprising a base, a layer of magnetic particles thereon and an over layer of non-magnetic material, said over layer having a thickness of 2-30 mils and said magnetic particle layer being magnetically digitally encoded, consecutive equal portions of said layer having one polarity of magnetic flux or the opposite polarity, with abrupt magnetic flux transitions between oppositely polarized portion, the minimum spacing between said magnetic flux transitions lying in the range 0.02 – 0.1 inch.

15. A flexible resilient magnetic particle type information card capable of correctly reading information thereon after such card has been bent back double on itself and creased at the region of the card that includes the magnetic particles, said card comprising a flexible base, a layer of uniformly distributed magnetic particles thereon, and a flexible overlayer of nonmagnetic material, said over layer having a thickness of at least 2 mils, said layer of magnetic particles being magnetically encoded, the magnetic flux transition of such encoding being at least 0.02 inch apart and said magnetic particle layer being enclosed between the base layer and over layer.

16. An information card in accordance with claim 15, in which the information is encoded in a least two tracks along said layer of magnetic particles, and the flux transitions are 0.02 to 0.10 inch apart.

17. An information card in accordance with claim 16 in which one track represents "ones" and the other track "zeros", the bits are at the interface of a change in polarity in either direction, and there is a change of polarity on one track or the other at each of the evenly spaced bit spaces.

18. An information card in accordance with claim 17, in which the overlayer is an organic plastic having a thickness of 2-10 mils and the minimum magnetic transition spacing being in the range 0.02 to 0.10 inch.

19. An information card in accordance with claim 18 in which the organic plastic overlay is polyethylene terephthalate having a coating of polyethylene on its underside.

20. An information card in accordance with claim 15 in which the card base is a sheet of polyethylene terephthalate having a layer of polyethylene thereon and including a sheet of cellulose acetate with one side against the said layer of polyethylene, the magnetic particles are coated on a strip of polyethylene terephthalate and are between the base sheet and the overlay sheet, and the overlay sheet is a sheet of polyethylene terephthalate having a layer of polyethylene thereon.

21. An information card in accordance with claim 15 in which the card base comprising a polyethylene terephthalate sheet having a layer of polyethylene thereon and a sheet of cellulose acetate on the said layer of polyethylene, the magnetizable particles are on a sheet of polyethylene terephthalate with the polyethylene terephthalate being against the celluose acetate sheet, and the over layer comprises a layer of polyethylene over the oxide layer and an upper sheet of polyethylene terephthalate on the polyethylene layer.

22. An information card in accordance with claim 20 in which an acrylic adhesive is on both sides of the cellulose acetate sheet so as to secure the magnetizable layer to one side of the cellulose acetate sheet and the base polyethylene layer to the other side of the cellulose acetate sheet.

23. An information card in accordance with claim 21 in which an acrylic adhesive is on both sides of the cellulose acetate sheet so as to secure the cellulose acetate sheet to the polyethylene layer on the underside of the over layer of polyethylene terephthalate.

24. An information card in accordance with claim 15 in which the magnetizable particles are in a stripe and completely enclosed so that the stripe of said particles stops short of all edges of the base and overlay material.

25. An information card in accordance with claim 15 in which the card is flexible and of such resiliency and flexibility that the card will bend into an indentation on application of pressure and will spring back on release of the pressure.

26. An information card in accordance with claim 15 in which the card base comprises a sheet of polyethylene terephthalate having a layer of polyethylene thereon and a sheet of cellulose acetate on said layer of polyethylene, the magnetic particles are on a strip of polyethylene terephthalate with the magnetic particles against the sheet of cellulose acetate and the polyethylene terephthalate on which the magnetic particles are coated is against the polyethylene layer of the overlying polyethylene terephthalate sheet.

27. An information card in accordance with claim 15 in which the card is composed of layers of plastic material of a flexibility and resilience such that on bending the card double on itself it will not break and will spring back at least part way to its original position.

* * * * *

UNITED STATES PATENT OFFICE
CERTIFICATE OF CORRECTION

Patent No. 4,058,839                    Dated November 15, 1977

Inventor(s)   John C. Darjany

It is certified that error appears in the above-identified patent and that said Letters Patent are hereby corrected as shown below:

In the title page, under "References Cited" and after the last patent listed, the following should be added:

Other Publications

Nortronics Design Digest, Nortronics Co. Inc. 2d edition, 1972.

Column 15, lines 51 and 52, "overlaying" should be -overlying-.

Signed and Sealed this

Twenty-eighth Day of March 1978

[SEAL]

Attest:

RUTH C. MASON
Attesting Officer

LUTRELLE F. PARKER
Acting Commissioner of Patents and Trademarks